United States Patent
Gross

(10) Patent No.: US 7,797,879 B1
(45) Date of Patent: Sep. 21, 2010

(54) TERMITE ALERT THAT USES GRAVITY TO CAUSE A COLOR CHANGING CHAIN REACTION

(76) Inventor: Keith Edgle Gross, 248 Madrid Ave., Punta Gorda, FL (US) 33950

( * ) Notice: Subject to any disclaimer, the term of this patent is extended or adjusted under 35 U.S.C. 154(b) by 437 days.

(21) Appl. No.: 11/784,190

(22) Filed: Apr. 5, 2007

Related U.S. Application Data

(60) Provisional application No. 60/744,545, filed on Apr. 10, 2006.

(51) Int. Cl.
*A01M 17/00* (2006.01)
*A01M 1/20* (2006.01)

(52) U.S. Cl. ........................................ 43/132.1; 43/131
(58) Field of Classification Search ............... 43/132.1, 43/121, 131, 107, 124
See application file for complete search history.

(56) References Cited

U.S. PATENT DOCUMENTS

| | | | |
|---|---|---|---|
| 4,485,582 A | 12/1984 | Morris | |
| 6,016,625 A * | 1/2000 | Bishoff et al. | 43/121 |
| 6,178,834 B1 * | 1/2001 | Cates | 73/865.8 |
| 6,266,918 B1 | 7/2001 | Henderson | |
| 6,357,170 B1 * | 3/2002 | Bordes, Jr. | 43/121 |
| 6,370,811 B1 | 4/2002 | Masterson | |
| 6,374,536 B1 * | 4/2002 | Washburn | 43/132.1 |
| 6,515,591 B2 * | 2/2003 | Lake et al. | 340/693.5 |
| 6,606,817 B2 * | 8/2003 | Oi et al. | 43/131 |
| 6,631,583 B2 | 10/2003 | Rollins | |
| 2001/0004237 A1 * | 6/2001 | Lake et al. | 340/573.1 |
| 2006/0016121 A1 * | 1/2006 | Ballard et al. | 43/132.1 |
| 2006/0117645 A1 * | 6/2006 | Cink et al. | 43/132.1 |
| 2007/0256350 A1 * | 11/2007 | Cates | 43/132.1 |

* cited by examiner

*Primary Examiner*—Kimberly S Smith
(74) *Attorney, Agent, or Firm*—Donald Grant Kelly

(57) ABSTRACT

A termite alert device for placement within an area subject to infestation by termites and the like, particularly at constructed walls, wooden floors, concrete, patios, pool deck, and other hard surfaces. The termite alert device housing includes a substantially clear viewing port beneath which is positioned a signal element which may be colored in contrast the housing interior. The signal element is supported by bait subject to ingestion by termites. As bait is consumed the element drops away in a mechanical chain reaction presenting an alerting appearance change established by a change in visualization as the element increases distance from the port. The alert device may be substantially vertical with cylindrical or other suitably-shaped bait material and signal element. Alternatively it could arch outwardly toward a side wall, with signal elements comprising a series of colored balls falling along the arch as they collapse downwardly in a mechanical chain reaction.

9 Claims, 2 Drawing Sheets

TERMITE ALERT THAT USES GRAVITY TO CAUSE A COLOR CHANGING CHAIN REACTION

REFERENCE TO RELATED APPLICATIONS

This application is entitled to the benefit of provisional patent Ser. No. 60/744,545 filed Apr. 10, 2006; such benefit is hereby claimed under 35 USC 119(e).

BACKGROUND OF THE INVENTION

Field of the Invention

The instant invention relates to generally finding termites and more particularly, to a termite alert that employs a visual change to signal the presence of termites in a bait station.

In the battle to find termites, one of the most popular and effective methods to find termites is with a bait station installed in the ground. Stations are commonly spread around the foundation of structures, then monitored by bending over to open a cap and remove blocks of wood. Movement of target food exposing termites to the environment disrupts social behavior and feeding habits. Termites therefore may leave to never return.

Members of the colony forage for food and burrow galleries or passageways in the soil outwardly from the colony or nest, and portions of food located by foraging termites are returned to the nest. Termites can be very destructive because of their voracious appetites, especially for wood and other cellulose materials. The ability of termites to cause considerable damage is in part due to the fact that the termites are typically not seen until termite infestation is at a relatively advanced stage. Termites are difficult to detect and control because they are cryptic creatures that usually cause damage to the interiors of wooden structures, or otherwise in places that are not readily observable.

Termites must have moisture and must transport food to the subterranean colonies in order to live. Consequently, they must return to the ground around or beside a building after they have eaten part of the building. If one can cut off the termites' entry or exit, one can substantially control them. A pesticide therefore may be applied at the areas of the building where the supporting structures touch the ground, or where the termites will enter or exit.

Current termite alerts rely on a spring or constant pressure to hold an alert down, subsequently releasing a pop up signal. These devices have their problems with rusting springs and decaying matter prematurely releasing the signal. On the other hand, a termite alert of the type described herebelow relying upon the earth's gravity to bring about a mechanical chain reaction resulting in a change of appearance of a colored visual signal element within a viewing port, wherein the change of appearance is established by a change in visualization provided by an increase in distance of the visual signal element from the viewing port may provide significant advantages over traditional methods of finding termites. Significantly, termite locations effectively found with visual detection typically require dramatically less labor involvement.

In the fight against termites there has been a long standing battle to find and destroy these cryptic creatures. Most all of the commercial bait stations on the market use little blocks of wood surrounded by some kind of cylinder. These types of stations require an intense labor involved maintenance program. The pest control technician must first find these devices, then bend over at every unit to open a cap and see if there are any termites present. Even if termites are found there is a good chance they will be disturbed and leave the area, never to return.

U.S. Pat. No. 6,370,811 Masterson relies on a spring load with constant pressure to hold down an alert that pops up. This type of invention has its problems with rusty springs and the constant pressure on biodegradable material buried in the earth's surface.

A termite alert device, to be described in detail herebelow, configured to use the earth's gravitational force to bring about a mechanical chain reaction resulting in a dropping of a viewable signal element away from a substantially clear cap is an improvement for most all commercial bait stations and alerts. The use of a colored cylinder or ball as the viewable signal element under the clear cap results in a an alerting change of appearance of the signal element established by a change in visualization resulting from an increase in distance of the signal element as it drops from the clear cap. Minimal disturbance to termites feeding and color changing visual detection are significant improvements in the war to fight these cryptic creatures.

The object of a termite alert that uses gravity to cause the mechanical chain reaction described hereabove is to bring forth high quality visual detection of creatures such as termites that are hidden in everyday life. The use of such termite alerts can be helpful when deployed for example in or through constructed walls, monitors, bait stations, wood floors, concrete, patios, pool decks, or any hard surfaces.

U.S. Pat. No. 4,485,582 to Morris discloses an insect feeding station having a base portion with inner walls spaced from outer walls to form a poison compartment, offset openings in said walls, offset openings means in the floor of said base, and, optionally, transparent means in the cover to view said compartment. Thus the insect feeding station may be entered from the sides or the bottom and is useful for the earth's insects. When at least one part of the cover is transparent, the poison compartment may have a contrasting or luminous color under the poison to make the removal of poison easily detectable.

U.S. Pat. No. 6,631,583 to Rollins discloses a bait station compromising a screw-shape body and a top. The screw-shape body at least partially defines a toxicant/bait-receiving chamber and defines at least one opening to the bait-receiving chamber. The top defines a top to the bait-receiving chamber.

U.S. Pat. No. 6,370,811 to Masterson discloses an apparatus for detecting the presence and eating activity of organisms such as termites that damage structures, includes a body; a wooden bait element controllably exposed to the organisms within a cavity of the body, and having an applied bait substance; a sidewall of the body having vertically spaced plurality of smoothly converging entrance passages for admitting the organism, a consumable porous barrier covering each of the entrance passages. Spring tension is applied to the upper end of the bait element, an opposite end being anchored to the body. A flag member that is connected to the upper end of the bait element projects from the body when the bait element is weakened to the predetermined amount by the organism.

U.S. Pat. No. 6,266,918 to Henderson et al. discloses a simple, inexpensive signal device indicates presence of wood-destroying insects, particularly subterranean termites. The signal device comprises a triggering mechanism and a signal mechanism. The device can be adapted to fit almost all commercially available monitors or bait stations. The triggering mechanism is designed to be released upon destruction by feeding termites or other wood eating insects. Upon release, the triggering mechanism is designed to either pull or push the visual signal out of the housing, producing a signal that can be seen from a distance. Using this signal device, the presence of termites can be detected without disturbing the monitor or bait station. Moreover, because the signal is seen outside the housing, the housing is not required to be transparent.

BRIEF DESCRIPTIONS OF THE DRAWINGS

DETAILED DESCRIPTION OF THE PREFERRED EMBODIMENT

Figure 1:
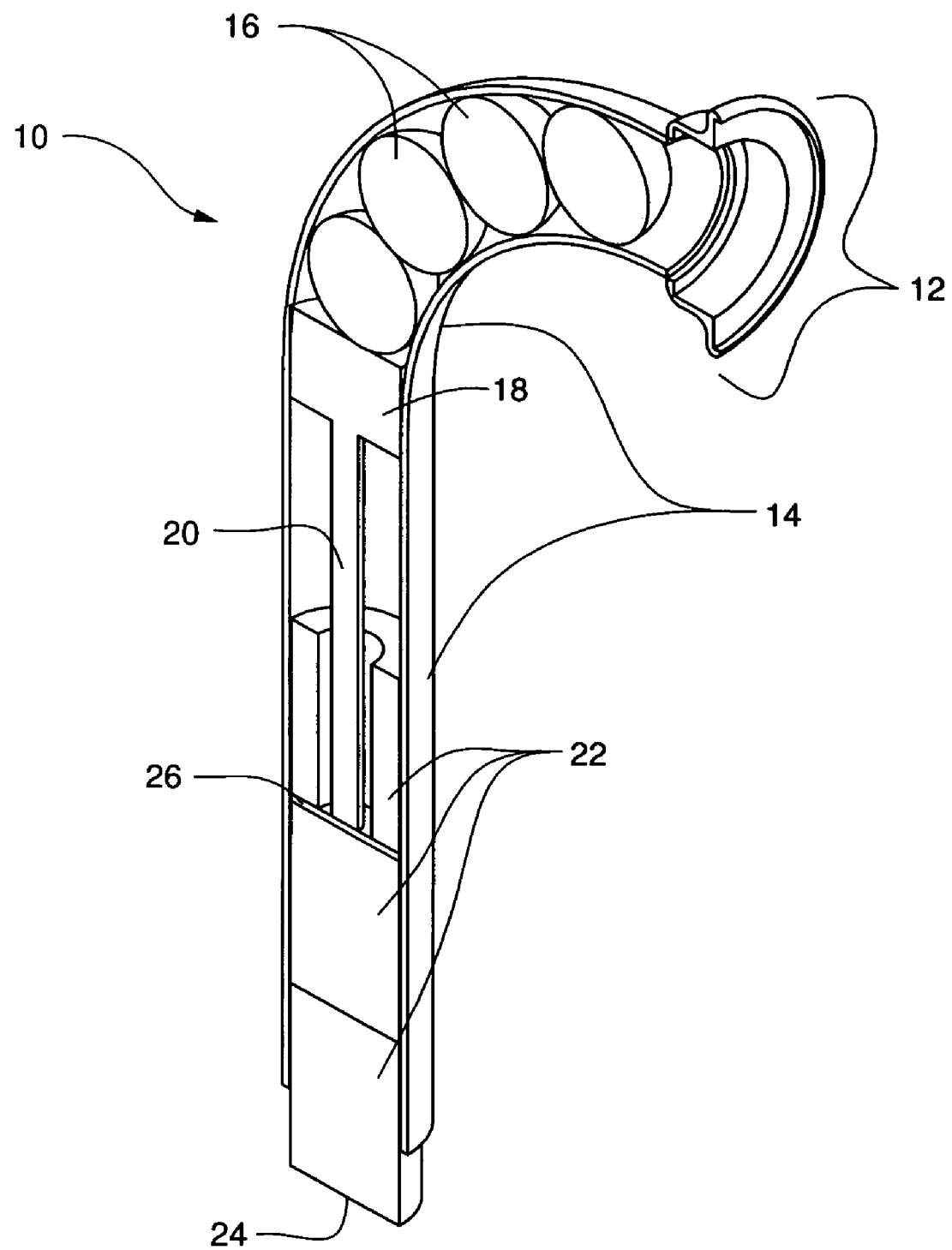
FIG. 1 is a perspective view of a visual termite alert with an arched tube that is configured to rely upon gravitational force to cause a color changing mechanical chain reaction signaling the presence of termites in constructed walls.

Referring now to the drawings in which like numerals indicate like parts throughout two views, the termite alert 10 (FIG. 1) is configured to rely upon gravitational force to cause a color changing mechanical chain reaction and is depicted as having an arch in the top or upper portion terminating at a first generally vertical planar end adjacent the viewing port and a substantially straight portion terminating at a second generally horizontally planar end thereof so as to be deployed in constructed walls. A substantially clear viewing cap 12 may be provided adjacent a first end of the termite alert housing 14 which itself may be substantially clear or solid colored tubing that structurally defines the present invention. Preferably, the housing 14 is formed from a durable, corrosion resistant material, as for an example, a high strength plastic or acrylic. Although shown as having a cylindrical shape, the housing 14 can be any other suitable shape, such as a rectangle. As can be seen in the upper arch, viewable signal elements in the form of colored balls 16 rest on heavier weighted cylinder 18 which in turn rests on gravity drop stick 20. Gravity drop stick 20 resides within an upper one of three separate sections 22 of bait source cellulose and rests on round disk trip mechanism 26 supported by a second or the middle section 22 of bait source cellulose. The third or bottom section 22 of bait source cellulose has a plug portion 24 that protrudes out of a second end of said housing 14 so as to make contact with cellulose inside the constructed walls.

Figure 2:
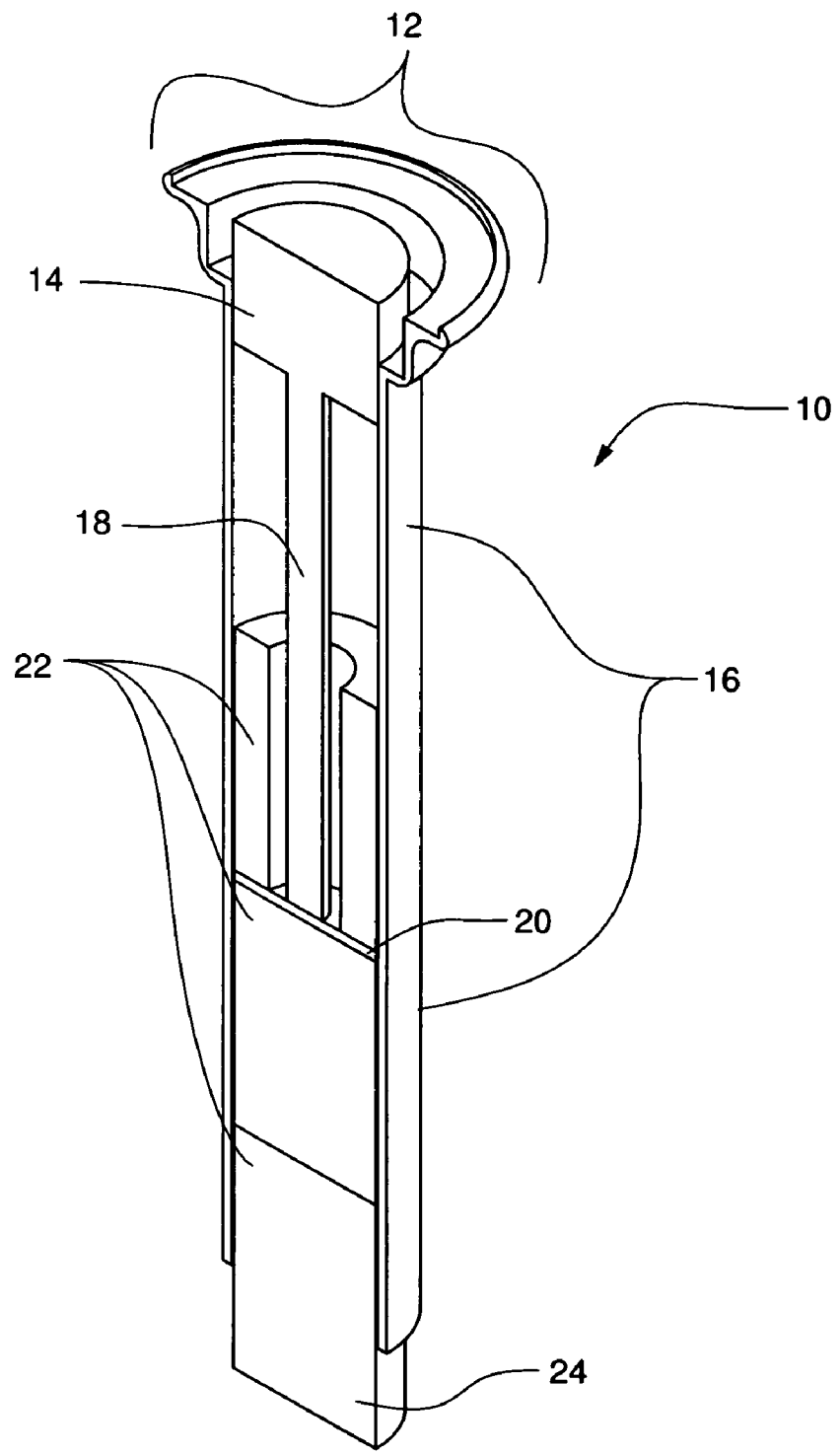
FIG. 2 is a perspective view of an alternative embodiment of termite alert with a straight tube configured to rely upon gravitational force to cause a mechanical chain reaction resulting in a change of appearance of a signal element signaling the presence of termites through hard surfaces or in bait stations.

Referring now to FIG. 2 of the drawing in which like numerals indicate like parts it will be seen that an alternative embodiment of termite alert 10, also configured to rely upon gravitational force to cause a mechanical chain reaction, includes a straight tubular housing 16 shaped so as to be used for example in the earth's surface, bait stations, monitors, wood floors, pool decks, concrete or any hard surfaces. Again, a substantially clear viewing cap 12 can be applied or fitted to a substantially clear or solid colored tubing 16 that structurally defines the present invention. Preferably, the housing 16 is formed from a durable, corrosion resistant material, as for example, high strength plastic or acrylic. Although shown as having a cylindrical shape, the housing 16 can be any other suitable shape, such as a rectangle. In this embodiment reference character 14 depicts a viewable signal element in the form of a heavier weighted colored cylinder which is positioned to gravity drop stick 18. Gravity drop stick 18 resides within the first of three separate sections 22 of bait source cellulose and rests on round disk trip mechanism 20 supported by a second or middle section 22 of bait source cellulose. The third or bottom bait source cellulose section 22 has a plug 24 that protrudes out of the housing 16 so cylinder as to make contact with the earth surface.

In the drawings and specifications there have been set forth a preferred embodiment of the invention, and although specific terms are employed, these are used in the generic and descriptive sense only and not for purpose of limitation. Changes in form and the proportion of parts as well as in the substitution of equivalents are contemplated as circumstances may suggest or render without departing from the spirit or scope of the invention as further defined in the following claims.

What is claimed is:

1. A termite alert device for visually determining the presence of termites within structures, the earth and the like, said termite alert device characterized as comprising:
   a termite bait source storage housing with a first and second end and a viewing port adjacent said first end;
   at least one bait source located within said housing and generally below said viewing port and extending outwardly of said housing second end whereby said bait source may make contact inside constructed walls or surrounding earth;
   a gravity drop stick within said housing structure between said viewing port and said at least one bait source;
   said gravity drop stick physically supported at least in part by said bait source;
   at least one visual signal element physically associated with said gravity drop stick and located adjacent said viewing port and positioned between said viewing port and said bait source;
   whereby, in a mechanical chain reaction, destruction of said bait source causes elimination of support for said gravity drop stick, in turn enabling gravity force to cause corresponding movement of said drop stick and its associated visual signal element in a direction away from said viewing port, resulting in a change of appearance within said viewing port as said visual signal element drops from sight, thus providing an alert signaling a condition change within said housing.

2. The alert device of claim 1 further characterized by:
   said visual signal element is colored;
   said change of appearance is established by a change in visualization provided by an increase in distance of the visual signal element from the viewing port.

3. The alert device of claim 1 further characterized by:
   said visual signal element is a colored cylinder.

4. The alert device of claim 1 further characterized by:
   said bait source is at least partially comprised of cellulose material.

5. The alert device of claim 1 further characterized by:
   said viewing port is closed by a substantially transparent cap.

6. The alert device of claim 1 further characterized by:
   said housing is constructed of a high strength plastic material.

7. A termite alert device for visually determining the presence of termites within structures, the earth and the like, said termite alert device characterized as comprising:
   a termite bait source storage housing with a viewing port adjacent a first end thereof;
   at least one bait source located within said housing and generally below said viewing port;
   a gravity drop stick within said housing structure between said viewing port and said at least one bait source;
   said gravity drop stick physically supported at least in part by said bait source;

at least one visual signal element physically associated with said gravity drop stick and located adjacent said viewing port and positioned between said viewing port and said bait source;

said housing is configured with an arched portion terminating at a first generally vertical planar end adjacent said viewing port;

said housing is further configured with a substantially straight portion terminating at a second generally horizontal end thereof;

said visual signal element is in the form of at least one ball;

whereby, in a mechanical chain reaction, destruction of said bait source causes elimination of support for said gravity drop stick, in turn enabling gravity force to cause corresponding movement of said drop stick and its associated at least one ball in a direction away from said viewing port where it is viewable, along said arch portion to a second position where it will not be visible at said viewing port resulting in a change of appearance within said viewing port as said visual signal element drops from sight, thus providing an alert signaling a condition change within said housing.

8. The alert device of claim 7 further characterized by:
said at least one ball is colored;
said change of appearance is established by a change in visualization provided by an increase in distance of the visual signal element from the viewing port.

9. A termite alert device for visually determining the presence of termites within structures, the earth and the like, said termite alert device characterized as comprising:
a termite bait source storage housing with a viewing port adjacent a first end thereof;
at least one bait source located within said housing and generally below said viewing port;
a gravity drop stick within said housing structure between said viewing port and said at least one bait source;
said gravity drop stick physically supported at least in part by said bait source;
at least one visual signal element physically associated with said gravity drop stick and located adjacent said viewing port and positioned between said viewing port and said bait source;
a gravity trip mechanism positioned between said gravity drop stick and said bait source;
said bait source is comprised of multiple bait source components;
said gravity drop stick extends through a first of said bait source components and engages a second of said bait source components indirectly through said gravity trip mechanism element;

whereby, in a mechanical chain reaction, progressive destruction of said second bait source causes elimination of support for said trip mechanism element and gravity drop stick, in turn enabling gravity force to cause corresponding movement of said drop stick and its associated visual signal element in a direction away from said viewing port as the mechanical chain reaction progresses, resulting in a change of appearance within said viewing port as said visual signal element drops from sight, thus providing an alert signaling a condition change within said housing.

* * * * *